(12) United States Patent
Wei et al.

(10) Patent No.: US 10,386,914 B2
(45) Date of Patent: Aug. 20, 2019

(54) METHOD AND APPARATUS FOR RUNNING APPLICATION PROGRAM

(71) Applicant: Huawei Technologies Co., Ltd., Shenzhen (CN)

(72) Inventors: Konggang Wei, Shenzhen (CN); Jing Zhao, Beijing (CN); Guanghua Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 15/512,454

(22) PCT Filed: Sep. 19, 2014

(86) PCT No.: PCT/CN2014/086909
§ 371 (c)(1),
(2) Date: Mar. 17, 2017

(87) PCT Pub. No.: WO2016/041190
PCT Pub. Date: Mar. 24, 2016

(65) Prior Publication Data
US 2017/0300103 A1 Oct. 19, 2017

(51) Int. Cl.
*G06F 9/00* (2006.01)
*G06F 1/329* (2019.01)
(Continued)

(52) U.S. Cl.
CPC ............ *G06F 1/329* (2013.01); *G06F 3/0346* (2013.01); *G06F 3/0488* (2013.01);
(Continued)

(58) Field of Classification Search
CPC ...... G06F 1/329; G06F 3/0346; G06F 3/0488; G06F 3/04883; G06F 3/167; G06F 9/4418; G06F 3/0482
(Continued)

(56) References Cited

U.S. PATENT DOCUMENTS 6,349,386 B1 * 2/2002 Chan ..................... G06F 1/1613
713/1
8,504,842 B1 8/2013 Meacham
(Continued)

FOREIGN PATENT DOCUMENTS

CN 102216895 A 10/2011
CN 102890540 A 1/2013
(Continued)

*Primary Examiner* — Aurel Prifti
(74) *Attorney, Agent, or Firm* — Leydig, Voit & Mayer, Ltd.

(57) ABSTRACT

The present invention discloses a method which includes: receiving, in a standby state, application entry information entered by a user; obtaining, according to the application entry information, an identifier of an application program that needs to be run; waking an operating system and keeping, still in a dormant state, a dormant application program in application programs except the application program that needs to be run; and running, by using the operating system and according to the identifier of the application program that needs to be run, the application program that needs to be run The apparatus includes: a receiving module, an obtaining module, a wake-up module, and a running module. In the present invention, only the application program that needs to be run is run, while the dormant application program in the application programs except the application program that needs to be run is still kept in the dormant state.

13 Claims, 3 Drawing Sheets

(51) Int. Cl.
  *G06F 3/0488* (2013.01)
  *G06F 3/0346* (2013.01)
  *G06F 3/16* (2006.01)
  *G06F 9/4401* (2018.01)

(52) U.S. Cl.
  CPC .......... *G06F 3/04883* (2013.01); *G06F 3/167* (2013.01); *G06F 9/4418* (2013.01)

(58) Field of Classification Search
  USPC .... 713/1, 320, 300, 310; 715/810, 765, 728, 715/863; 707/610
  See application file for complete search history.

(56) References Cited

U.S. PATENT DOCUMENTS

| | | | | |
|---|---|---|---|---|
| 8,621,494 | B2* | 12/2013 | Singh | G06F 1/3203 719/328 |
| 9,730,069 | B2* | 8/2017 | Noh | H04W 12/08 |
| 9,971,313 | B2* | 5/2018 | Chung | G04G 21/00 |
| 9,998,924 | B2* | 6/2018 | Kim | H04L 63/0861 |
| 2005/0253823 | A1 | 11/2005 | Kazama et al. | |
| 2007/0067445 | A1* | 3/2007 | Vugenfirer | H04L 67/141 709/224 |
| 2010/0162182 | A1 | 6/2010 | Oh et al. | |
| 2010/0257447 | A1 | 10/2010 | Kim et al. | |
| 2010/0262853 | A1 | 10/2010 | Goda | |
| 2011/0069024 | A1* | 3/2011 | Kim | G06F 3/01 345/173 |
| 2011/0191610 | A1* | 8/2011 | Agarwal | G06F 1/3203 713/310 |
| 2011/0213992 | A1* | 9/2011 | Satsangi | G06F 1/3209 713/300 |
| 2012/0023788 | A1* | 2/2012 | Ollinger, IV | E02F 9/2825 37/453 |
| 2012/0137165 | A1* | 5/2012 | Wu | G06F 11/2025 714/4.11 |
| 2013/0021270 | A1 | 1/2013 | Lee | |
| 2013/0033422 | A1 | 2/2013 | Choi et al. | |
| 2013/0055160 | A1* | 2/2013 | Yamada | G06F 3/017 715/810 |
| 2013/0125916 | A1 | 5/2013 | Babaev | |
| 2013/0227419 | A1* | 8/2013 | Lee | G06F 9/48 715/728 |
| 2013/0275915 | A1* | 10/2013 | Wang | G06F 8/60 715/810 |
| 2013/0283199 | A1 | 10/2013 | Selig et al. | |
| 2014/0113688 | A1* | 4/2014 | Liang | G06F 3/017 455/566 |
| 2014/0165012 | A1 | 6/2014 | Shen et al. | |
| 2014/0198051 | A1* | 7/2014 | Idzik | G06F 3/0488 345/173 |
| 2014/0201833 | A1 | 7/2014 | Wang | |
| 2014/0237273 | A1* | 8/2014 | Hirano | G06F 1/32 713/320 |
| 2014/0359167 | A1* | 12/2014 | Balasubramanian | H04L 29/06095 709/250 |
| 2015/0088817 | A1* | 3/2015 | Dwan | G06F 16/16 707/610 |
| 2015/0199102 | A1* | 7/2015 | Koh | G06F 3/0488 715/835 |
| 2015/0227282 | A1* | 8/2015 | Oh | G06F 3/04883 715/863 |
| 2016/0021614 | A1* | 1/2016 | Liu | H04W 4/12 370/311 |
| 2016/0070466 | A1* | 3/2016 | Chaudhri | G06F 3/0484 715/765 |
| 2016/0328143 | A1* | 11/2016 | Hu | G06F 3/04883 |
| 2017/0018100 | A1 | 1/2017 | Yee et al. | |
| 2017/0177058 | A1* | 6/2017 | Biggs | G06F 9/00 |
| 2018/0152893 | A1* | 5/2018 | Guo | H04W 52/0229 |
| 2018/0159695 | A1* | 6/2018 | Semii | G06F 9/4401 |

FOREIGN PATENT DOCUMENTS

| | | |
|---|---|---|
| CN | 102968174 A | 3/2013 |
| CN | 102999291 A | 3/2013 |
| CN | 103034328 A | 4/2013 |
| CN | 103176714 A | 6/2013 |
| CN | 103345360 A | 10/2013 |
| CN | 103631356 A | 3/2014 |
| CN | 103677267 A | 3/2014 |
| CN | 103760969 A | 4/2014 |
| CN | 104049722 A | 9/2014 |
| EP | 2755122 A1 | 7/2014 |
| GB | 2486707 A | 6/2012 |
| JP | 2003520365 A | 7/2003 |
| JP | 2010250512 A | 11/2010 |
| JP | 2013182381 A | 9/2013 |
| JP | 2014157490 A | 8/2014 |
| KR | 20100073743 A | 7/2010 |
| KR | 101412448 B1 | 6/2014 |
| WO | 2004111822 A1 | 12/2004 |

\* cited by examiner

METHOD AND APPARATUS FOR RUNNING APPLICATION PROGRAM

CROSS-REFERENCE TO RELATED APPLICATION

This application is a national phase of International Application No. PCT/CN2014/086909, filed Sep. 19, 2014, the entire contents of which are hereby incorporated by reference.

TECHNICAL FIELD

The present invention relates to the field of computer technologies, and in particular, to a method and an apparatus for running an application program.

BACKGROUND

Currently, to save a system resource and reduce system power consumption, when a user does not use a terminal for a long time or a user presses a power button or a lock screen button after finishing using a terminal, the terminal makes a running application program and operating system to be dormant, so that the terminal enters a standby state, so as to save the system resource and reduce the system power consumption.

When the terminal is in the standby state, if the user wants to run a specific application program, the user needs to submit a wake-up request to the terminal. The terminal receives the wake-up request submitted by the user, wakes the operating system, and runs a dormant application program by using the operating system, so that the terminal enters a wake-up state. Then, the user may submit a running request to the terminal by tapping a running interface corresponding to an application program that needs to be run, and the terminal receives the running request submitted by the user and obtains an identifier of the application program that needs to be run. The terminal runs, by using the operating system and according to the identifier of the application program that needs to be run, the application program that needs to be run.

In a process of running an application program, the terminal runs not only the application program that needs to be run, but also a dormant application program while the dormant application program is not an application program that the user currently needs to run. The running dormant application program occupies a system resource, which wastes the system resource and increases the system power consumption.

SUMMARY

To save a system resource and reduce system power consumption, the present invention provides a method and an apparatus for running an application program. A technical solution is as follows:

A first aspect provides a method for running an application program, where the method includes:

receiving, in a standby state, application entry information entered by a user;

obtaining, according to the application entry information, an identifier of an application program that needs to be run;

waking an operating system and keeping, still in a dormant state, a dormant application program in application programs except the application program that needs to be run; and running, by using the operating system and according to the identifier of the application program that needs to be run, the application program that needs to be run.

With reference to the foregoing first aspect, in a first possible implementation manner of the foregoing first aspect, the obtaining, according to the application entry information, an identifier of an application program that needs to be run includes:

obtaining an identifier of a corresponding application program from a correspondence between application entry information and an identifier of an application program according to the application entry information; and determining the obtained identifier of the application program as the identifier of the application program that needs to be run.

With reference to the foregoing first aspect, in a second possible implementation manner of the foregoing first aspect, before the receiving application entry information entered by a user, the method further includes:

setting application entry information corresponding to each application program; and separately storing the application entry information corresponding to each application program and an identifier of each application program into a correspondence between application entry information and an identifier of an application program.

With reference to the foregoing first aspect, in a third possible implementation manner of the foregoing first aspect, the waking an operating system and keeping, still in a dormant state, a dormant application program in application programs except the application program that needs to be run includes:

waking a system device, a bus, and an external device by using a wake-up process, so as to wake the operating system;

obtaining, by using the operating system, an identifier of the dormant application program in the application programs except the application program that needs to be run; and keeping, still in the dormant state by using a process group management interface in the operating system and according to the obtained identifier of the application program, the dormant application program in the application programs except the application program that needs to be run.

With reference to the foregoing first aspect, in a fourth possible implementation manner of the foregoing first aspect, the running, by using the operating system and according to the identifier of the application program that needs to be run, the application program that needs to be run includes:

allocating, by using the operating system and according to the identifier of the application program that needs to be run, a system resource to the application program that needs to be run; and starting, by using a process group management interface at a process unfreezing layer in the operating system and according to the identifier of the application program that needs to be run and the allocated system resource, the application program that needs to be run to run the application program that needs to be run.

With reference to the foregoing first aspect, in a fifth possible implementation manner of the foregoing first aspect, after the running, by using the operating system and according to the identifier of the application program that needs to be run, the application program that needs to be run, the method further includes:

obtaining, according to the identifier of the application program that needs to be run, an identifier of an application program on which the application program that needs to be run depends;

allocating a system resource to the depended-upon application program according to the identifier of the depended-upon application program by using the operating system; and starting the depended-upon application program according to the identifier of the depended-upon application program and the allocated system resource by using a process group management interface at a process unfreezing layer in the operating system.

With reference to the foregoing first aspect, in a sixth possible implementation manner of the foregoing first aspect, after the running, by using the operating system and according to the identifier of the application program that needs to be run, the application program that needs to be run, the method further includes:

when it is detected that an exit command of the application program that needs to be run is triggered, obtaining, by using the operating system, running information of the application program that needs to be run, and storing, by using the operating system, the running information of the application program that needs to be run; and making the application program that needs to be run and the operating system to be dormant by using a process group management interface, so that a terminal enters the standby state.

A second aspect provides an apparatus for running an application program, where the apparatus includes:

a receiving module, configured to receive, in a standby state, application entry information entered by a user;

an obtaining module, configured to obtain, according to the application entry information, an identifier of an application program that needs to be run;

a wake-up module, configured to wake an operating system and keep, still in a dormant state, a dormant application program in application programs except the application program that needs to be run; and a running module, configured to run, by using the operating system and according to the identifier of the application program that needs to be run, the application program that needs to be run.

With reference to the foregoing second aspect, in a first possible implementation manner of the foregoing second aspect, the obtaining module includes:

a first obtaining unit, configured to obtain an identifier of a corresponding application program from a correspondence between application entry information and an identifier of an application program according to the application entry information; and a determining unit, configured to determine the obtained identifier of the application program as the identifier of the application program that needs to be run.

With reference to the foregoing second aspect, in a second possible implementation manner of the foregoing second aspect, the apparatus further includes:

a setting module, configured to set application entry information corresponding to each application program; and a storage module, configured to separately store the application entry information corresponding to each application program and an identifier of each application program into a correspondence between application entry information and an identifier of an application program.

With reference to the foregoing second aspect, in a third possible implementation manner of the foregoing second aspect, the wake-up module includes:

a wake-up unit, configured to wake a system device, a bus, and an external device by using a wake-up process, so as to wake the operating system;

a second obtaining unit, configured to obtain, by using the operating system, an identifier of the dormant application program in the application programs except the application program that needs to be run; and a keeping unit, configured to keep, still in the dormant state by using a process group management interface in the operating system and according to the obtained identifier of the application program, the dormant application program in the application programs except the application program that needs to be run.

With reference to the foregoing second aspect, in a fourth possible implementation manner of the foregoing second aspect, the running module includes:

a first allocation unit, configured to allocate, by using the operating system and according to the identifier of the application program that needs to be run, a system resource to the application program that needs to be run; and a first starting unit, configured to start, by using a process group management interface at a process unfreezing layer in the operating system and according to the identifier of the application program that needs to be run and the allocated system resource, the application program that needs to be run to run the application program that needs to be run.

With reference to the foregoing second aspect, in a fifth possible implementation manner of the foregoing second aspect, the running module further includes:

a third obtaining unit, configured to obtain, according to the identifier of the application program that needs to be run, an identifier of an application program on which the application program that needs to be run depends;

a second allocation unit, configured to allocate a system resource to the depended-upon application program according to the identifier of the depended-upon application program by using the operating system; and a second starting unit, configured to start the depended-upon application program according to the identifier of the depended-upon application program and the allocated system resource by using a process group management interface at a process unfreezing layer in the operating system.

With reference to the foregoing second aspect, in a sixth possible implementation manner of the foregoing second aspect, the apparatus further includes:

an obtaining and storage module, configured to: when it is detected that an exit command of the application program that needs to be run is triggered, obtain, by using the operating system, running information of the application program that needs to be run, and store, by using the operating system, the running information of the application program that needs to be run; and a dormant module, configured to make the application program that needs to be run and the operating system to be dormant by using a process group management interface, so that a terminal enters the standby state.

A third aspect provides an apparatus for running an application program, where the apparatus includes a sensing apparatus and a processor;

the sensing apparatus is configured to receive, in a standby state, application entry information entered by a user; and the processor is configured to obtain, according to the application entry information, an identifier of an application program that needs to be run, wake an operating system and keep, still in a dormant state, a dormant application program in application programs except the application program that needs to be run, and run, by using the operating system and according to the identifier of the application program that needs to be run, the application program that needs to be run.

With reference to the foregoing third aspect, in a first possible implementation manner of the foregoing third aspect, the processor is configured to obtain an identifier of a corresponding application program from a correspondence between application entry information and an identifier of an application program according to the application entry information, and determine the obtained identifier of the application program as the identifier of the application program that needs to be run.

With reference to the foregoing third aspect, in a second possible implementation manner of the foregoing third aspect, the apparatus further includes a memory;

the processor is further configured to set application entry information corresponding to each application program; and the memory is configured to separately store the application entry information corresponding to each application program and an identifier of each application program into a correspondence between application entry information and an identifier of an application program.

With reference to the foregoing third aspect, in a third possible implementation manner of the foregoing third aspect, the processor is configured to wake a system device, a bus, and an external device by using a wake-up process, so as to wake the operating system; obtain, by using the operating system, an identifier of the dormant application program in the application programs except the application program that needs to be run; and keep, still in the dormant state by using a process group management interface in the operating system and according to the obtained identifier of the application program, the dormant application program in the application programs except the application program that needs to be run.

With reference to the foregoing third aspect, in a fourth possible implementation manner of the foregoing third aspect, the processor is configured to allocate, by using the operating system and according to the identifier of the application program that needs to be run, a system resource to the application program that needs to be run; and start, by using a process group management interface at a process unfreezing layer in the operating system and according to the identifier of the application program that needs to be run and the allocated system resource, the application program that needs to be run to run the application program that needs to be run.

With reference to the foregoing third aspect, in a fifth possible implementation manner of the foregoing third aspect, the processor is further configured to obtain, according to the identifier of the application program that needs to be run, an identifier of an application program on which the application program that needs to be run depends; allocate a system resource to the depended-upon application program according to the identifier of the depended-upon application program by using the operating system; and start the depended-upon application program according to the identifier of the depended-upon application program and the allocated system resource by using a process group management interface at a process unfreezing layer in the operating system.

With reference to the foregoing third aspect, in a sixth possible implementation manner of the foregoing third aspect, the processor is further configured to: when it is detected that an exit command of the application program that needs to be run is triggered, obtain, by using the operating system, running information of the application program that needs to be run, and store, by using the operating system, the running information of the application program that needs to be run; and make the application program that needs to be run and the operating system to be dormant by using a process group management interface, so that a terminal enters the standby state.

With reference to the foregoing third aspect, in a seventh possible implementation manner of the foregoing third aspect, the sensing apparatus includes at least a touch-sensitive apparatus, a voice sensing apparatus, and/or a motion sensing apparatus.

In embodiments of the present invention, application entry information entered by a user is received in a standby state; an identifier of an application program that needs to be run is obtained according to the application entry information; an operating system is woken, and a dormant application program in application programs except the application program that needs to be run is still kept in a dormant state; and the application program that needs to be run is run by using the operating system and according to the identifier of the application program that needs to be run. The dormant application program in the application programs except the application program that needs to be run is still kept in the dormant state when the application program that needs to be run is run, and therefore, only the application program that needs to be run is run, thereby saving a system resource and reducing system power consumption.

DESCRIPTION OF EMBODIMENTS

To make the objectives, technical solutions, and advantages of the present invention clearer, the following further describes exemplary embodiments of the present invention in detail with reference to the accompanying drawings.

Embodiment 1

Figure 1:
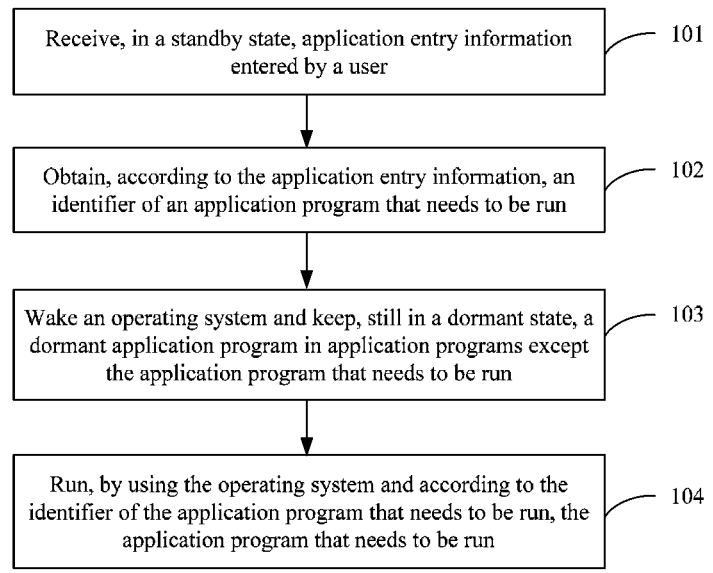
FIG. 1 is a flowchart of a method for running an application program according to Embodiment 1 of the present invention.

Referring to FIG. 1, this embodiment of the present invention provides a method for running an application program, where the method includes the following steps:

Step 101: Receive, in a standby state, application entry information entered by a user.

A touch-sensitive apparatus is disposed on a screen of a terminal, and a voice sensing apparatus and/or a motion sensing apparatus may be further disposed on the terminal. The touch-sensitive apparatus may be a contact pressure sensor or the like, and is configured to sense a track of a character entered by the user on the screen of the terminal. The voice sensing apparatus may be a voice sensor, a recording device, or the like, and is configured to receive voice data entered by the user. The motion sensing apparatus may be a motion sensor or the like, and is configured to sense a moving track generated when the user moves the terminal. When developing the terminal, skilled people may set that when the terminal is in the standby state, the touch-sensitive apparatus, the voice sensing apparatus, and the motion sensing apparatus still work normally. Thereby, the terminal may receive, in the standby state by using the touch-sensitive apparatus, the voice sensing apparatus, and the motion sensing apparatus, the application entry information entered by the user.

This step is specifically: sensing, in the standby state by using the touch-sensitive apparatus, the track of the character entered by the user on the screen of the terminal, and using the track as the application entry information entered by the user; or receiving, in the standby state by using the voice sensing apparatus, the voice data entered by the user, and using the voice data as the application entry information entered by the user; or sensing, in the standby state by using the motion sensing apparatus, the moving track generated when the user moves the terminal, and using the moving track as the application entry information entered by the user.

Step 102: Obtain, according to the application entry information, an identifier of an application program that needs to be run.

Step 103: Wake an operating system and keep, still in a dormant state, a dormant application program in application programs except the application program that needs to be run.

Step 104: Run, by using the operating system and according to the identifier of the application program that needs to be run, the application program that needs to be run.

Preferably, the obtaining, according to the application entry information, an identifier of an application program that needs to be run includes:

obtaining an identifier of a corresponding application program from a correspondence between application entry information and an identifier of an application program according to the application entry information; and determining the obtained identifier of the application program as the identifier of the application program that needs to be run.

The application entry information is the track of the character entered by the user on the screen of the terminal, the voice data entered by the user to the terminal, or the moving track generated when the user moves the terminal. For example, application entry information of an application program game may be a track of a character g entered by the user on the screen of the terminal, voice data "game" entered by the user to the terminal, or a moving track g generated when the user moves the terminal.

Further, before the receiving application entry information entered by a user, the method further includes:

setting application entry information corresponding to each application program; and separately storing the application entry information corresponding to each application program and an identifier of each application program into a correspondence between application entry information and an identifier of an application program. Specifically, the application entry information corresponding to each application program and the identifier of each application program may be stored in a memory.

Preferably, the waking an operating system and keeping, still in a dormant state, a dormant application program in application programs except the application program that needs to be run includes:

waking a system device, a bus, and an external device by using a wake-up process, so as to wake the operating system;

obtaining, by using the operating system, an identifier of the dormant application program in the application programs except the application program that needs to be run; and keeping, still in the dormant state by using a process group management interface in the operating system and according to the obtained identifier of the application program, the dormant application program in the application programs except the application program that needs to be run.

The system device may be a CPU (central processing unit), a BIOS (basic input output system), a mother board, a memory, or the like. The external device may be an input device, a display device, and the like, where the input device may be a keyboard, a mouse, a voice input apparatus, or the like, and the display device may be a monitor, a screen, or the like.

The process group management interface is a process management interface provided by the operating system, and is configured to manage all processes running on the terminal.

Preferably, the running, by using the operating system and according to the identifier of the application program that needs to be run, the application program that needs to be run includes:

allocating, by using the operating system and according to the identifier of the application program that needs to be run, a system resource to the application program that needs to be run; and starting, by using a process group management interface at a process unfreezing layer in the operating system and according to the identifier of the application program that needs to be run and the allocated system resource, the application program that needs to be run to run the application program that needs to be run.

The process unfreezing layer is a module provided by the operating system, and is configured to unfreeze a dormant process.

Further, after the running, by using the operating system and according to the identifier of the application program that needs to be run, the application program that needs to be run, the method further includes:

obtaining, according to the identifier of the application program that needs to be run, an identifier of an application program on which the application program that needs to be run depends;

allocating a system resource to the depended-upon application program according to the identifier of the depended-upon application program by using the operating system; and starting the depended-upon application program according to the identifier of the depended-upon application program and the allocated system resource by using a process group management interface at a process unfreezing layer in the operating system.

The depended-upon application program is an application program invoked when the application program that needs to be run is running. An application program includes multiple functions, and sometimes, it is necessary to invoke another application program to implement a function. For example, an alarm clock has a reminder function, and to implement the reminder function, a player may need to be invoked to play music for reminding, where the player is an application program on which the alarm clock depends. Therefore, to normally run the application program that needs to be run, it may be further necessary to run the application program on which the application program that needs to be run depends.

Further, after the running, by using the operating system and according to the identifier of the application program that needs to be run, the application program that needs to be run, the method further includes:

when it is detected that an exit command of the application program that needs to be run is triggered, obtaining, by using the operating system, running information of the application program that needs to be run, and storing, by using the operating system, the running information of the application program that needs to be run; and making the application program that needs to be run and the operating system to be dormant by using a process group management interface, so that a terminal enters the standby state.

In this embodiment of the present invention, application entry information entered by a user is received in a standby state; an identifier of an application program that needs to be run is obtained according to the application entry information; an operating system is woken, and a dormant application program in application programs except the application program that needs to be run is still kept in a dormant state; and the application program that needs to be run is run by using the operating system and according to the identifier of the application program that needs to be run. The dormant application program in the application programs except the application program that needs to be run is still kept in the dormant state when the application program that needs to be run is run, and therefore, only the application program that needs to be run is run, thereby saving a system resource and reducing system power consumption.

Embodiment 2

Figure 2:
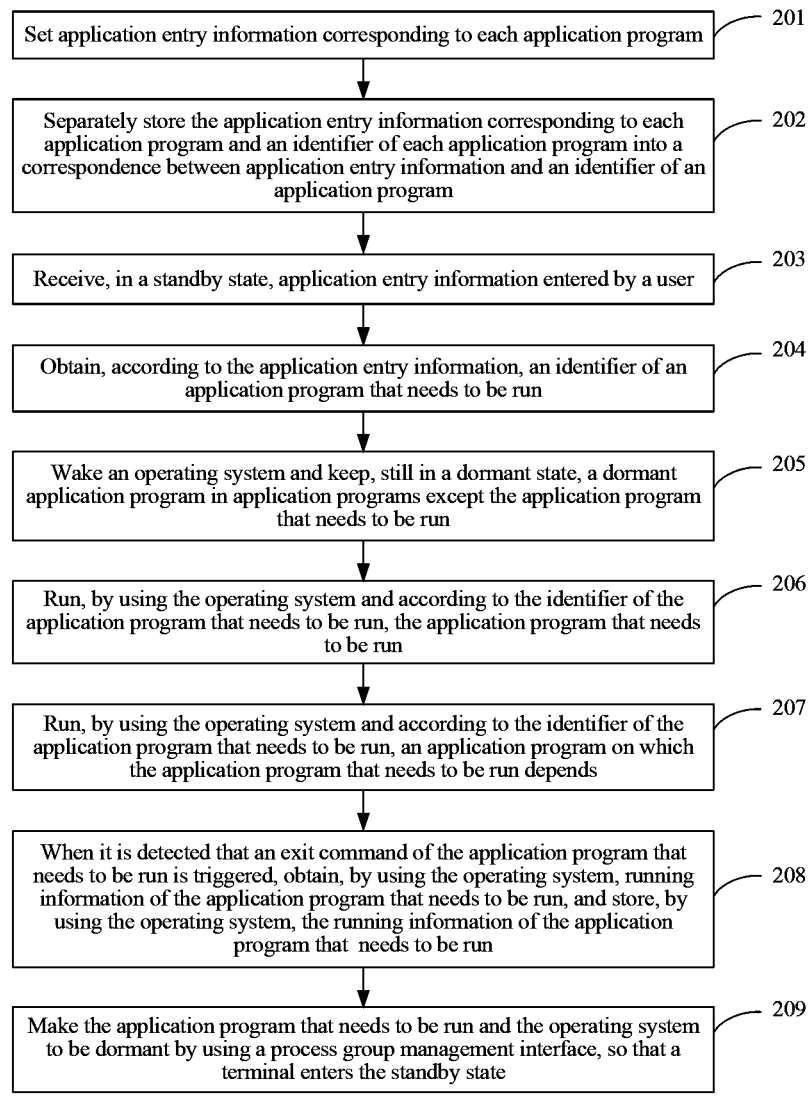
FIG. 2 is a flowchart of a method for running an application program according to Embodiment 2 of the present invention.

Referring to FIG. 2, this embodiment of the present invention provides a method for running an application program. When a user wants to run an application program that needs to be run, without running another application program, a terminal may run, by using the method provided in this embodiment of the present invention, the application program that needs to be run, where the method specifically includes the following steps:

Step 201: Set application entry information corresponding to each application program.

Application entry information corresponding to an application program may be a preset track or preset voice corresponding to the application program. A shape of the preset track may be an initial or the like of a name of the application program, and the preset voice may be voice or the like of the name of the application program.

The terminal provides each application program with a setting interface that is configured to set application entry information. Before the terminal comes into the market, skilled people may enter the preset track or the preset voice corresponding to the application program by using the setting interface corresponding to the application program; or after the terminal comes into the market, the user enters the preset track or the preset voice corresponding to the application program by using the setting interface corresponding to the application program.

This step is specifically: for each application program installed on the terminal, receiving, by using a setting interface corresponding to the application program, a preset track or preset voice that is corresponding to the application program and entered by the user, and using the received preset track or preset voice as application entry information corresponding to the application program.

For each of other application programs, except the application program, installed on the terminal, application entry information corresponding to each of the other application programs may be set according to the foregoing manner, just like the application program.

For example, it is assumed that application programs 1, 2, and 3 are installed on the terminal, names of the application programs 1, 2, and 3 are respectively message, game, and clock, and initials of the names of the application programs 1, 2, and 3 are respectively m, g, and c. A preset track m and/or preset voice "message" that are/is corresponding to the application program 1 and entered by the user are/is received by using a setting interface corresponding to the application program 1, and the received preset track m and/or preset voice "message" are/is used as application entry information corresponding to the application program 1. A preset track g and/or preset voice "game" that are/is corresponding to the application program 2 and entered by the user are/is received by using a setting interface corresponding to the application program 2, and the received preset track g and/or preset voice "game" are/is used as application entry information corresponding to the application program 2. A preset track c and/or preset voice "clock" that are/is corresponding to the application program 3 and entered by the user are/is received by using a setting interface corresponding to the application program 3, and the received preset track c and/or preset voice "clock" are/is used as application entry information corresponding to the application program 3.

Step 202: Separately store the application entry information corresponding to each application program and an identifier of each application program into a correspondence between application entry information and an identifier of an application program.

The identifier of the application program may be a name of the application program, a number that the terminal allocates to the application program, or the like.

This step is specifically: for each application program installed on the terminal, when application entry information corresponding to the application program is set by using a setting interface corresponding to the application program, obtaining an identifier of the application program, and storing the application entry information corresponding to the application program and the identifier of the application program into the correspondence between application entry information and an identifier of an application program. Specifically, the application entry information corresponding to the application program and the identifier of the application program may be stored in a memory.

For each of other application programs, except the application program, installed on the terminal, application entry information corresponding to each of the other application programs and an identifier of each of the other application programs may be separately stored into the correspondence between application entry information and an identifier of an application program according to the foregoing manner, just like the application program.

For example, it is assumed that identifiers of the application programs 1, 2, and 3 are respectively 001, 002, and 003. When the application entry information corresponding to the application program 1 is set by using the setting interface corresponding to the application program 1, the identifier 001 of the application program 1 is obtained, and the application entry information (the preset track m or the preset voice "message") corresponding to the application program 1 and the identifier 001 of the application program 1 are stored into the correspondence that is shown in Table 1 and between application entry information and an identifier of an application program.

TABLE 1

| Application entry information | Identifier of an application program |
|---|---|
| (Preset track m or preset voice "message") | 001 |
| (Preset track g or preset voice "game") | 002 |
| (Preset track c or preset voice "clock") | 003 |

For another example, when the application entry information corresponding to the application program 2 is set by using the setting interface corresponding to the application program 2, the identifier 002 of the application program 2 is obtained, and the application entry information (the preset track g or the preset voice "game") corresponding to the application program 2 and the identifier 002 of the application program 2 are stored into the correspondence that is shown in Table 1 and between application entry information and an identifier of an application program.

For still another example, when the application entry information corresponding to the application program 3 is set by using the setting interface corresponding to the application program 3, the identifier 003 of the application program 3 is obtained, and the application entry information (the preset track c or the preset voice "clock") corresponding to the application program 3 and the identifier 003 of the application program 3 are stored into the correspondence that is shown in Table 1 and between application entry information and an identifier of an application program.

After the application entry information corresponding to each application program is set by performing the foregoing step 201, and the correspondence between the application entry information corresponding to each application program and the identifier of each application program is stored by performing the foregoing step 202, when the terminal is in a standby state and the user wants to run a specific application program, the user may run the application program by performing the following steps 203-206 according to application entry information corresponding to the application program.

Step 203: Receive, in a standby state, application entry information entered by a user.

A touch-sensitive apparatus is disposed on a screen of the terminal, and a voice sensing apparatus and/or a motion sensing apparatus may be further disposed on the terminal. The touch-sensitive apparatus may be a contact pressure sensor or the like, and is configured to sense a track of a character entered by the user on the screen of the terminal; the voice sensing apparatus may be a voice sensor, a recording device, or the like, and is configured to receive voice data entered by the user; and the motion sensing apparatus may be a motion sensor or the like, and is configured to sense a moving track generated when the user moves the terminal. When developing the terminal, skilled people may set that when the terminal is in the standby state, the touch-sensitive apparatus, the voice sensing apparatus, and the motion sensing apparatus still work normally. Thereby, in the standby state, that is, when the screen of the terminal is off, the application entry information entered by the user can be received by using the touch-sensitive apparatus, the voice sensing apparatus, and the motion sensing apparatus without lighting up the screen of the terminal.

When the user does not use the terminal for a long time or the user presses a power button or a lock screen button after finishing using the terminal, the terminal makes a running application program and an operating system to be dormant, so that the terminal enters the standby state. In this case, the touch-sensitive apparatus on a touchscreen of the terminal is still in an enabled state, and the user may make a movement on the touchscreen by using a finger, a stylus, or the like to enable the touch-sensitive apparatus to identify a moving track of the finger, the stylus, or the like, so as to enter information to the terminal. In addition, when the terminal is in the standby state, the user may move a spatial location of the terminal to enable the motion sensing apparatus on the terminal to sense a moving track of the terminal, so as to enter information to the terminal; or the user may speak to the terminal to enable the voice sensing apparatus on the terminal to record what the user has spoken to obtain a segment of voice data, so as to enter information to the terminal.

When the terminal is in the standby state, the user enters the application entry information to the terminal by using the touch-sensitive apparatus, the voice sensing apparatus, or the motion sensing apparatus that still works normally; when it is determined that the application entry information is application entry information corresponding to a specific application program, an instruction for waking the terminal is triggered to wake the terminal.

This step is specifically: in the standby state, receiving, by using the touch-sensitive apparatus, a first moving track entered by the user, and using the first moving track as the application entry information entered by the user; or identifying, by using the motion sensing apparatus, a second moving track generated when the user moves the terminal, and using the second moving track as the application entry information entered by the user; or recording, by using the voice sensing apparatus, voice made by the user to obtain a segment of voice data, and using the voice data as the application entry information entered by the user.

For example, it is assumed that the user writes a character m by using a finger on the touch-sensitive apparatus. The first moving track m entered by the user is received in the standby state by using the touch-sensitive apparatus, and the first moving track m is used as application entry information R1 entered by the user.

For another example, it is assumed that when the user moves the spatial location of the terminal, the moving track of the terminal is of a shape of the character m. The second moving track m generated when the user moves the terminal is identified in the standby state by using the motion sensing apparatus, and the second moving track m is used as the application entry information R1 entered by the user.

For still another example, it is assumed that the user makes voice "message" to a mobile phone. The voice "message" made by the user is recorded in the standby state by using the voice sensing apparatus, to obtain a segment of voice data "message", and the voice data "message" is used as the application interface information R1 entered by the user.

Step 204: Obtain, according to the received application entry information, an identifier of an application program that needs to be run.

Specifically, application entry information that is the most similar to the received application entry information is found according to the received application entry information from the correspondence between application entry information and an identifier of an application program. An identifier of a corresponding application program is obtained from the correspondence between application entry information and an identifier of an application program. The obtained identifier of the application program is determined as the identifier of the application program that needs to be run.

A method for finding the application entry information that is the most similar to the received application entry information from the correspondence between application entry information and an identifier of an application program is specifically:

obtaining all application entry information included in the correspondence between application entry information and an identifier of an application program, where if the received application entry information is the first moving track received by the touch-sensitive apparatus or the second moving track identified by the motion sensing apparatus, separately obtaining a preset track included in each piece of application entry information, separately calculating similarities between the received first track or the received second track and each preset track, and determining application entry information corresponding to a preset track with a maximum similarity as the found application entry information; and if the received application entry information is a segment of voice data, separately obtaining preset voice included in each piece of application entry information, separately calculating similarities between the received voice data and each piece of preset voice, and determining application entry information corresponding to preset voice with a maximum similarity as the found application entry information.

For example, it is assumed that the received application entry information R1 is the first moving track m received by the touch-sensitive apparatus or the second moving track m identified by the motion sensing apparatus. According to the application entry information R1, the identifier 001 of the application program corresponding to the application entry information R1 is obtained from the correspondence that is shown in Table 1 and between application entry information and an identifier of an application program, and a specific obtaining process is as follows:

All application entry information included in the correspondence that is shown in Table 1 and between application entry information and an identifier of an application program is obtained, that is, application entry information (the preset track m or the preset voice "message"), (the preset track g or the preset voice "game"), and (the preset track c or the preset voice "clock") is obtained. Preset tracks included in all the application entry information are obtained, that is, the preset tracks m, g, and c are obtained; similarities between the received first track m or second track m and each of the preset tracks m, g, and c are separately calculated; and it is assumed that the calculated similarities with the preset tracks m, g, and c are respectively 1, 0, and 0. Application entry information (the preset track m or the preset voice "message") corresponding to the preset track m with the maximum similarity is determined as the found application entry information. According to the found application entry information (the preset track m or the preset voice "message"), the identifier 001 of the corresponding application program is obtained from the correspondence that is shown in Table 1 and between application entry information and an identifier of an application program. The obtained identifier 001 of the application program is determined as the identifier of the application program that needs to be run.

For another example, it is assumed that the received application entry information R1 is the segment of voice data "message". All application entry information included in the correspondence that is shown in Table 1 and between application entry information and an identifier of an application program is obtained, that is, application entry information (the preset track m or the preset voice "message"), (the preset track g or the preset voice "game"), and (the preset track c or the preset voice "clock") is obtained. Preset voice included in all the application entry information is obtained, that is, the preset voice "message", "game", and "clock" is obtained; similarities between the received voice data "message" and each piece of the preset voice "message", "game", and "clock" are separately calculated; and it is assumed that the calculated similarities with the preset voice "message", "game", and "clock" are respectively 1, 0, and 0. Application entry information (the preset track m or the preset voice "message") corresponding to the preset voice "message" with the maximum similarity is determined as the found application entry information. According to the found application entry information (the preset track m or the preset voice "message"), the identifier 001 of the corresponding application program is obtained from the correspondence that is shown in Table 1 and between application entry information and an identifier of an application program. The obtained identifier 001 of the application program is determined as the identifier of the application program that needs to be run.

After the identifier of the application program that needs to be run is obtained by performing the foregoing steps 203 and 204, it may be further necessary to enable the terminal to enter a wake-up state from the standby state by performing the following step 205.

Step 205: Wake an operating system and keep, still in a dormant state, a dormant application program in application programs except the application program that needs to be run.

When the terminal is in the standby state, if the user wants to run an application program, first the user may need to wake the operating system of the terminal to enable the terminal to enter the wake-up state from the standby state. When the terminal enters the standby state, all of a system device, a bus, and an external device are made to be dormant, and therefore, the system device, the bus, and the external device may need to be woken when the terminal is woken. The system device may be a CPU, a BIOS, a mother board, a memory, or the like. The external device may be an input device, a display device, and the like, where the input device may be a keyboard, a mouse, a voice input apparatus, or the like, and the display device may be a monitor, a screen, or the like.

This step is specifically: waking the system device, the bus, and the external device by using a wake-up process, so as to wake the operating system; obtaining, by using the operating system, an identifier of the dormant application program in the application programs except the application program that needs to be run; and keeping, still in the dormant state by using a process group management interface and according to the obtained identifier of the application program, the dormant application program in the application programs except the application program that needs to be run.

The application program in the dormant state does not occupy a system resource.

For example, it is assumed that there are application programs 001, 002, and 003 on the terminal, where the application program 001 is the application program that needs to be run, and the application program 002 is made to be dormant when the terminal previously enters the standby state. The system device, the bus, and the external device are woken by using the wake-up process, so as to wake the operating system. An identifier 002 of a dormant application program in application programs except the application program 001 that needs to be run is obtained by using the operating system. The dormant application program 002 in the application programs except the application program 001 that needs to be run is still kept in the dormant state according to the obtained identifier 002 of the application program by using the process group management interface.

Function pm_enter( ) is a power management function that is used to start various devices when the terminal is being woken. Function cpu_init( ) in function pm_enter( ) is used to start the CPU. Function suspend_enter( ) is a function of enabling dormancy, and function suspend_enter( ) is performed when the terminal enters the dormant state, until dormancy is completed. When the terminal is to be woken, function sysdev_resume( ) starts to be performed at a location at which function suspend_enter( ) stops at a previous time. Function sysdev_resume( ) is a wake-up function, used to wake the system device and the bus. Function suspend_devices_and_enter( ) is a function of making a device to be dormant/waking the device, and is used to make the external device to be dormant when the terminal is made to be dormant, and wake the external device when the terminal is woken.

When the terminal is woken from the standby state, function cpu_init( ) in pm_enter( ) is performed, and then function sysdev_resume( ) of suspend_enter( ) is performed to wake the system device and the bus, so that an enabling system is interrupted. Then, go back to function suspend_devices_and_enter( ) where a non-started CPU (central processing unit) that is disabled when the dormancy is enabled, and the external device continues to be woken to enable the terminal. After performing suspend_devices_and_enter( ) is finished, the system device and the external device have been woken, a helper process between users is enabled to broadcast a notification that the system exits the standby state, so as to wake the terminal. However, all other tasks do not receive the notification, and therefore, a utilization ratio of the CPU is extremely low, close to a utilization ratio of the CPU in the dormant state; therefore, although the terminal enters the wake-up state from the standby state, the dormant application program on the terminal is still in a frozen state in this case.

The CPU, the BIOS, all the mother board, the memory, and the like are woken when the system device is woken; and all the input device, the display device, and the like are woken when the external device is woken.

Step 206: Run, by using the operating system and according to the identifier of the application program that needs to be run, the application program that needs to be run.

Specifically, a system resource is allocated, by using the operating system and according to the identifier of the application program that needs to be run, to the application program that needs to be run. The application program that needs to be run is started, by using a process group management interface at a process unfreezing layer in the operating system and according to the identifier of the application program that needs to be run and the allocated system resource, so as to run the application program that needs to be run.

The allocated system resource includes a CPU, a memory, network bandwidth, and the like.

For example, a system resource is allocated, by using the operating system and according to the identifier 001 of the application program that needs to be run, to the application program that needs to be run. The application program 001 that needs to be run is started, by using the process group management interface at the process unfreezing layer in the operating system and according to the identifier 001 of the application program that needs to be run and the allocated system resource, so as to run the application program 001 that needs to be run.

A Kernel (operating system kernel) layer interface is invoked by using a JNI (Java Native Interface), to transfer the identifier of the application program that needs to be run to a process freezing/unfreezing layer, and the system resource is allocated, by invoking the process group management interface at the process freezing/unfreezing layer, to the application program that needs to be run, so as to unfreeze the application program that needs to be run. Another application program except the application program that needs to be run is still frozen.

After the application program that needs to be run is run by performing the foregoing step 206, the following step 207 may need to be performed to run an application program on which the application program that needs to be run depends.

Step 207: Run, by using the operating system and according to the identifier of the application program that needs to be run, an application program on which the application program that needs to be run depends.

The depended-upon application program is an application program invoked when the application program that needs to be run is running. An application program includes multiple functions, and sometimes, it is necessary to invoke another application program to implement a function. For example, an alarm clock has a reminder function, and to implement the reminder function, a player may need to be invoked to play music for reminding. Therefore, to normally run the application program that needs to be run, it may be further necessary to run the application program on which the application program that needs to be run depends.

An installation file of an application program includes an identifier of an application program on which the application program depends.

This step is specifically: obtaining, according to the identifier of the application program that needs to be run, an installation file of the application program that needs to be run; obtaining, from the installation file of the application program that needs to be run, an identifier of the application program on which the application program that needs to be run depends; allocating a system resource to the depended-upon application program according to the identifier of the depended-upon application program by using the operating system; and starting the depended-upon application program according to the identifier of the depended-upon application program and the allocated system resource by using a process group management interface at a process unfreezing layer in the operating system.

For example, it is assumed that the application program 001 that needs to be run depends on the application program 003. According to the identifier 001 of the application program that needs to be run, an installation file setup1 of the application program 001 that needs to be run is obtained. An identifier 003 of the application program on which the application program 001 that needs to be run depends is obtained from the installation file setup1 of the application program 001 that needs to be run. A system resource is allocated to the depended-upon application program 003 according to the identifier 003 of the depended-upon application program by using the operating system. The depended-upon application program 003 is started according to the identifier 003 of the depended-upon application program and the allocated system resource by using the process group management interface at the process unfreezing layer in the operating system.

In the depended-upon application program, only a function on which the application program that needs to be run depends is run, and another function included in the depended-upon application program may be still in a frozen state.

After the application program that needs to be run and the depended-upon application program are run by performing the foregoing steps 206 and 207, the user can visit only the application program that needs to be run. When the user does not use for a long time the application program that needs to be run, or the user wants to visit another application program, the following steps 208 and 209 may be performed to exit the application program that needs to be run.

Step 208: When it is detected that an exit command of the application program that needs to be run is triggered, obtain, by using the operating system, running information of the application program that needs to be run, and store, by using the operating system, the running information of the application program that needs to be run.

The exit command of the application program that needs to be run may be triggered when the user does not use for a long time the application program that needs to be run, or the user taps an exit button of the application program that needs to be run, or the user presses a power button or a lock screen button on the terminal, or the user presses a Home button on the terminal. The running information of the application program that needs to be run includes at least page information and a process identifier that are displayed by the application program that currently needs to be run.

This step is specifically: when it is detected that the exit command of the application program that needs to be run is triggered, obtaining, by using the operating system, page information and a process identifier that are currently displayed by the application program that needs to be run; using the obtained page information and process identifier as the running information of the application program that needs to be run; and storing, by using the operating system, the identifier of the application program that needs to be run and the running information of the application program that needs to be run into a correspondence between an identifier of an application program and running information. Specifically, the identifier and the running information that are of the application program that needs to be run may be stored in a memory.

For example, when it is detected that an exit command of the application program 001 that needs to be run is triggered, page information page1 and a process identifier Pr1 that are currently displayed by the application program 001 that needs to be run are obtained by using the operating system; the obtained page information page1 and process identifier Pr1 are used as running information M1 of the application program that needs to be run; and the identifier 001 of the application program that needs to be run and the running information M1 of the application program 001 that needs to be run are stored, by using the operating system, into a correspondence that is shown in Table 2 and between an identifier of an application program and running information.

TABLE 2

| Identifier of an application program | Running information |
|---|---|
| 001 | M1 |
| ... | ... |

Step 209: Make the application program that needs to be run and the operating system to be dormant by using a process group management interface, so that a terminal enters the standby state.

Specifically, a system resource occupied by the application program that needs to be run is released by using the process group management interface, and the application program that needs to be run and the operating system are made to be dormant, so that the terminal enters the standby state.

For example, a system resource occupied by the application program 001 that needs to be run is released by using the process group management interface, and the application program 001 that needs to be run and the operating system are made to be dormant, so that the terminal enters the standby state.

Further, the application program on which the application program that needs to be run depends is released by further using the process group management interface, and the depended-upon application program is made to be dormant.

The Kernel layer interface is invoked by using the JNI, so as to transfer the identifier of the application program that needs to be run to the process freezing/unfreezing layer; and at the process freezing/unfreezing layer, the process group management interface is invoked to release a system resource occupied by the application program that needs to be run and the application program on which the application program that needs to be run depends, the application program that needs to be run and the application program on which the application program that needs to be run depends are made to be dormant, and then the operating system is made to be dormant, so that the terminal enters the standby state.

Same as the application program that needs to be run, each of other application programs installed on the terminal may be run according to the method provided in this embodiment of the present invention.

In this embodiment of the present invention, the user runs, by using the application entry information corresponding to the application program that needs to be run, the application program that needs to be run, so that the user can visit only the application program that needs to be run, but not another application program. A scenario in which only one application program can be visited is referred to as a single-task scenario, and a scenario in which multiple application programs can be visited at the same time is referred to as a multi-task scenario. In the multi-task scenario, the user may run an application program by tapping an icon of the application program. When the terminal is in the single-task scenario and the user wants to visit multiple application programs, the foregoing steps 208 and 209 may be performed to exit the application program that needs to be run, so as to exit the single-task scenario and enable the terminal to enter the standby state. Then, if the user wants to enter the multi-task scenario, the terminal displays an unlock interface, so that the user unlocks the screen of the terminal on the unlock interface, so as to enter the multi-task scenario.

When the user does not use for a long time the application program that needs to be run, or the user taps the exit button of the application program that needs to be run or presses the power button or the lock screen button on the terminal to exit the single-task scenario, the terminal makes the application program that needs to be run and the application program on which the application program that needs to be run depends to be dormant by performing the foregoing steps 208 and 209, so that the terminal enters the standby state. In this case, if the user wants to use another application program in the single-task scenario, the method provided in this embodiment of the present invention is used again to enter the single-task scenario to use the another application program; or if the user wants to enter the multi-task scenario to simultaneously use multiple application programs, the user may press the power button, the Home button, or the lock screen button to enable the terminal to display the unlock interface; the user enters a correct unlocking password on the unlock interface, and after the terminal verifies that the unlocking password entered by the user is correct, the terminal unlocks the screen, so as to enter the multi-task scenario.

When the user exits the single-task scenario by pressing the Home button on the terminal, the terminal makes, by performing the foregoing steps 208 and 209, the application program that needs to be run and the application program on which the application program that needs to be run depends to be dormant, then displays the unlock interface to the user; the user may enter the correct unlocking password on the unlock interface, and after the terminal verifies that the unlocking password entered by the user is correct, the terminal unlocks the screen. At this moment, the terminal enters the multi-task scenario, and the user can simultaneously use multiple application programs in the multi-task scenario.

In this embodiment of the present invention, when the terminal enters the standby state, the terminal always locks the screen, and only when the user enters the correct unlocking password, the terminal unlocks the screen. In a case in which the screen is locked, the user enters the single-task scenario, according to the application entry information of the application program that needs to be run, so as to run the application program that needs to be run, so that the user can visit only the application program that needs to be run, but not another application program.

All of a single-core-CPU terminal, a dual-core-CPU terminal, and a multi-core-CPU terminal can run the single-task scenario and the multi-task scenario described in this embodiment of the present invention. In the single-core-CPU terminal, a single-core CPU may serially process each process of the application program that needs to be run, and in the dual-core-CPU or the multi-core-CPU terminal, processes of the application program that needs to be run may be allocated to multiple CPUs for parallel processing, so that a processing speed can be increased. Therefore, both the single-core-CPU terminal and the multi-core-CPU terminal can run the single-task scenario and the multi-task scenario provided in this embodiment of the present invention, and a running speed of the multi-core CPU is faster than a running speed of the single-core CPU In this embodiment of the present invention, application entry information entered by a user is received in a standby state; an identifier of an application program that needs to be run is obtained according to the application entry information; an operating system is woken, and a dormant application program in application programs except the application program that needs to be run is still kept in a dormant state; and the application program that needs to be run is run by using the operating system and according to the identifier of the application program that needs to be run. The dormant application program in the application programs except the application program that needs to be run is still kept in the dormant state when the application program that needs to be run is run, and therefore, only the application program that needs to be run is run, thereby saving a system resource and reducing system power consumption.

Embodiment 3

Figure 3:
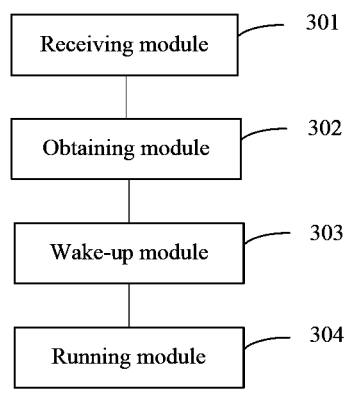
FIG. 3 is a schematic structural diagram of an apparatus for running an application program according to Embodiment 3 of the present invention.

Referring to FIG. 3, this embodiment of the present invention provides an apparatus for running an application program, including:

a receiving module 301, configured to receive, in a standby state, application entry information entered by a user;

an obtaining module 302, configured to obtain, according to the application entry information, an identifier of an application program that needs to be run;

a wake-up module 303, configured to wake an operating system and keep, still in a dormant state, a dormant application program in application programs except the application program that needs to be run; and a running module 304, configured to run, by using the operating system and according to the identifier of the application program that needs to be run, the application program that needs to be run.

The obtaining module 302 includes:

a first obtaining unit, configured to obtain an identifier of a corresponding application program from a correspondence between application entry information and an identifier of an application program according to the application entry information; and a determining unit, configured to determine the obtained identifier of the application program as the identifier of the application program that needs to be run.

Further, the apparatus further includes:

a setting module, configured to set application entry information corresponding to each application program; and a storage module, configured to separately store the application entry information corresponding to each application program and an identifier of each application program into a correspondence between application entry information and an identifier of an application program.

The wake-up module 303 includes:

a wake-up unit, configured to wake a system device, a bus, and an external device by using a wake-up process, so as to wake the operating system;

a second obtaining unit, configured to obtain, by using the operating system, an identifier of the dormant application program in the application programs except the application program that needs to be run; and a keeping unit, configured to keep, still in the dormant state by using a process group management interface in the operating system and according to the obtained identifier of the application program, the dormant application program in the application programs except the application program that needs to be run.

The running module 304 includes:

a first allocation unit, configured to allocate, by using the operating system and according to the identifier of the application program that needs to be run, a system resource to the application program that needs to be run; and a first starting unit, configured to start, by using a process group management interface at a process unfreezing layer in the operating system and according to the identifier of the application program that needs to be run and the allocated system resource, the application program that needs to be run to run the application program that needs to be run.

Further, the running module 304 further includes:

a third obtaining unit, configured to obtain, according to the identifier of the application program that needs to be run, an identifier of an application program on which the application program that needs to be run depends;

a second allocation unit, configured to allocate a system resource to the depended-upon application program according to the identifier of the depended-upon application program by using the operating system; and a second starting unit, configured to start the depended-upon application program according to the identifier of the depended-upon application program and the allocated system resource by using a process group management interface at a process unfreezing layer in the operating system.

Further, the apparatus further includes:

an obtaining and storage module, configured to: when it is detected that an exit command of the application program that needs to be run is triggered, obtain, by using the operating system, running information of the application program that needs to be run, and store, by using the operating system, the running information of the application program that needs to be run; and a dormant module, configured to make the application program that needs to be run and the operating system to be dormant by using a process group management interface, so that a terminal enters the standby state.

In this embodiment of the present invention, application entry information entered by a user is received in a standby state; an identifier of an application program that needs to be run is obtained according to the application entry information; an operating system is woken, and a dormant application program in application programs except the application program that needs to be run is still kept in a dormant state; and the application program that needs to be run is run by using the operating system and according to the identifier of the application program that needs to be run. The dormant application program in the application programs except the application program that needs to be run is still kept in the dormant state when the application program that needs to be run is run, and therefore, only the application program that needs to be run is run, thereby saving a system resource and reducing system power consumption.

Embodiment 4

Figure 4:
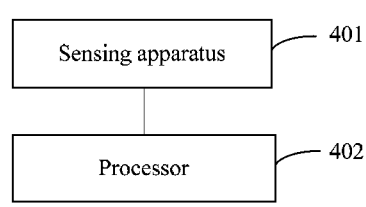
FIG. 4 is a schematic structural diagram of an apparatus for running an application program according to Embodiment 4 of the present invention.

Referring to FIG. 4, this embodiment of the present invention provides an apparatus for running an application program, where the apparatus includes a sensing apparatus 401 and a processor 402.

The sensing apparatus 401 is configured to receive, in a standby state, application entry information entered by a user.

The sensing apparatus 401 may be a touch-sensitive apparatus, a voice sensing apparatus, a motion sensing apparatus, and/or the like. The touch-sensitive apparatus is disposed on a screen of a terminal, and the voice sensing apparatus and/or the motion sensing apparatus may be further disposed on the terminal. The touch-sensitive apparatus may be a contact pressure sensor or the like, and is configured to sense a track of a character entered by the user on the screen of the terminal; the voice sensing apparatus may be a voice sensor, a recording device, or the like, and is configured to receive voice data entered by the user; and the motion sensing apparatus may be a motion sensor or the like, and is configured to sense a moving track generated when the user moves the terminal. When developing the terminal, skilled people may set that when the terminal is in the standby state, the touch-sensitive apparatus, the voice sensing apparatus, and the motion sensing apparatus still work normally. Thereby, the terminal may receive, in the standby state by using the touch-sensitive apparatus, the voice sensing apparatus, and the motion sensing apparatus, the application entry information entered by the user.

This step is specifically: sensing, in the standby state by using the touch-sensitive apparatus, the track of the character entered by the user on the screen of the terminal, and using the track as the application entry information entered by the user; or receiving, in the standby state by using the voice sensing apparatus, the voice data entered by the user, and using the voice data as the application entry information entered by the user; or sensing, in the standby state by using the motion sensing apparatus, the moving track generated when the user moves the terminal, and using the moving track as the application entry information entered by the user.

The processor 402 is configured to obtain, according to the application entry information, an identifier of an application program that needs to be run, wake an operating system and keep, still in a dormant state, a dormant application program in application programs except the application program that needs to be run, and run, by using the operating system and according to the identifier of the application program that needs to be run, the application program that needs to be run.

The processor 402 is configured to obtain an identifier of a corresponding application program from a correspondence between application entry information and an identifier of an application program according to the application entry information; and determine the obtained identifier of the application program as the identifier of the application program that needs to be run.

The application entry information is the track of the character entered by the user on the screen of the terminal, the voice data entered by the user to the terminal, or the moving track generated when the user moves the terminal. For example, application entry information of an application program game may be a track of a character g entered by the user on the screen of the terminal, voice data "game" entered by the user to the terminal, or a moving track g generated when the user moves the terminal.

Further, the apparatus further includes a memory;

the processor 402 is configured to set application entry information corresponding to each application program; and the memory is configured to separately store the application entry information corresponding to each application program and an identifier of each application program into a correspondence between application entry information and an identifier of an application program, where specifically, the application entry information corresponding to each application program and the identifier of each application program may be stored in the memory.

The processor 402 is configured to wake a system device, a bus, and an external device by using a wake-up process, so as to wake the operating system; obtain, by using the operating system, an identifier of the dormant application program in the application programs except the application program that needs to be run; and keep, still in the dormant state by using a process group management interface in the operating system and according to the obtained identifier of the application program, the dormant application program in the application programs except the application program that needs to be run.

The system device may be a CPU (central processing unit), a BIOS (basic input output system), a mother board, a memory, or the like. The external device may be an input device, a display device, and the like, where the input device may be a keyboard, a mouse, a voice input apparatus, or the like, and the display device may be a monitor, a screen, or the like.

The process group management interface is a process management interface provided by the operating system, and is configured to manage all processes running on the terminal.

The processor 402 is configured to allocate, by using the operating system and according to the identifier of the application program that needs to be run, a system resource to the application program that needs to be run; and start, by using a process group management interface at a process unfreezing layer in the operating system and according to the identifier of the application program that needs to be run and the allocated system resource, the application program that needs to be run to run the application program that needs to be run.

The process unfreezing layer is a module provided by the operating system, and is configured to unfreeze a dormant process.

Further, the processor 402 is further configured to obtain, according to the identifier of the application program that needs to be run, an identifier of an application program on which the application program that needs to be run depends; allocate a system resource to the depended-upon application program according to the identifier of the depended-upon application program by using the operating system; and start the depended-upon application program according to the identifier of the depended-upon application program and the allocated system resource by using a process group management interface at a process unfreezing layer in the operating system.

The depended-upon application program is an application program invoked when the application program that needs to be run is running. An application program includes multiple functions, and sometimes, it is necessary to invoke another application program to implement a function. For example, an alarm clock has a reminder function, and to implement the reminder function, a player may need to be invoked to play music for reminding, where the player is an application program on which the alarm clock depends. Therefore, to normally run the application program that needs to be run, it may be further necessary to run the application program on which the application program that needs to be run depends.

Further, the processor 402 is further configured to: when it is detected that an exit command of the application program that needs to be run is triggered, obtain, by using the operating system, running information of the application program that needs to be run, and store, by using the operating system, the running information of the application program that needs to be run; and make the application program that needs to be run and the operating system to be dormant by using a process group management interface, so that the terminal enters the standby state.

In this embodiment of the present invention, application entry information entered by a user is received in a standby state; an identifier of an application program that needs to be run is obtained according to the application entry information; an operating system is woken, and a dormant application program in application programs except the application program that needs to be run is still kept in a dormant state; and the application program that needs to be run is run by using the operating system and according to the identifier of the application program that needs to be run. The dormant application program in the application programs except the application program that needs to be run is still kept in the dormant state when the application program that needs to be run is run, and therefore, only the application program that needs to be run is run, thereby saving a system resource and reducing system power consumption.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention. Additionally, statements made herein characterizing the invention refer to an embodiment of the invention and not necessarily all embodiments.

What is claimed is:

1. A method for running an application program, wherein the method comprises:
   receiving, by an apparatus in a standby state, application entry information entered by a user;
   obtaining, by the apparatus, according to the received application entry information, an identifier of a first application program that needs to be run;
   waking, by the apparatus, an operating system and keeping one or more application programs other than the first application program in a dormant state; and
   running, by the apparatus, by using the operating system and according to the identifier of the first application program, the first application program;
   wherein after beginning to run the first application program, the method further comprises:
   obtaining, according to the identifier of the first application program, an identifier of a second application program on which the first application program depends;
   allocating a system resource to the second application program according to the identifier of the second application program by using the operating system; and
   starting the second application program according to the identifier of the second application program and the allocated system resource by using a process group management interface at a process unfreezing layer in the operating system, wherein the first application program depends on a first function of the second application program, and the first function of the second application program is run while one or more other functions of the second application program are in a frozen state.

2. The method according to claim 1, wherein obtaining the identifier of the first application program comprises:
   obtaining the identifier of the first application program from a correspondence between the received application entry information and the identifier of the first application program.

3. The method according to claim 1, wherein before receiving the application entry information entered by the user, the method further comprises:
   setting application entry information corresponding to each application program; and
   storing correspondences between the set application entry information corresponding to application programs and respective identifiers of the application programs.

4. The method according to claim 1, wherein waking the operating system and keeping the one or more application programs other than the first application program in a dormant state comprises:
- waking a system device, a bus, and an external device by using a wake-up process, so as to wake the operating system;
- obtaining, by using the operating system, identifier(s) of the one or more application programs other than the first application program; and
- keeping, by using the process group management interface and according to the obtained identifier(s), the one or more application programs other than the first application program in a dormant state.

5. The method according to claim 1, wherein running the first application program comprises:
- allocating, by using the operating system and according to the identifier of the first application program, a system resource to the first application program; and
- starting, by using the process group management interface and according to the identifier of the first application program and the allocated system resource, the first application program.

6. The method according to claim 1, wherein after beginning to run the first application program, the method further comprises:
- when it is detected that an exit command of the first application program is triggered, obtaining, by using the operating system, running information of the first application program, and storing, by using the operating system, the running information of the first application program; and
- making the first application program and the operating system dormant by using the process group management interface.

7. An apparatus for running an application program, wherein the apparatus comprises:
- a sensing apparatus; and
- a processor;
- wherein the sensing apparatus is configured to receive, while the apparatus is in a standby state, application entry information entered by a user; and
- wherein the processor is configured to:
- obtain, according to the received application entry information, an identifier of a first application program that needs to be run;
- wake an operating system and keep one or more application programs other than the first application program in a dormant state; and
- run, by using the operating system and according to the identifier of the first application program, the first application program;
- wherein the processor is further configured to:
- obtain, according to the identifier of the first application program, an identifier of a second application program on which the first application program depends;
- allocate a system resource to the second application program according to the identifier of the second application program by using the operating system; and
- start the second application program according to the identifier of the second application program and the allocated system resource by using a process group management interface at a process unfreezing layer in the operating system, wherein the first application program depends on a first function of the second application program, and the first function of the second application program is run while one or more other functions of the second application program are in a frozen state.

8. The apparatus according to claim 7, wherein obtaining the identifier of the first application program comprises:
- obtaining the identifier of the first application program from a correspondence between the received application entry information and the identifier of the first application program.

9. The apparatus according to claim 7, wherein the apparatus further comprises a memory;
- wherein the processor is further configured to set application entry information corresponding to each application program; and
- wherein the memory is configured to store correspondences between the set application entry information corresponding to application programs and respective identifiers of the application programs.

10. The apparatus according to claim 7, wherein waking the operating system and keeping the one or more application programs other than the first application program in a dormant state comprises:
- waking a system device, a bus, and an external device by using a wake-up process, so as to wake the operating system;
- obtaining, by using the operating system, identifier(s) of the one or more application programs other than the first application program; and
- keeping, by using the process group management interface and according to the obtained identifier(s), the one or more application programs other than the first application program in a dormant state.

11. The apparatus according to claim 7, wherein running the first application program comprises:
- allocating, by using the operating system and according to the identifier of the first application program, a system resource to the first application program; and
- starting, by using the process group management interface and according to the identifier of the first application program and the allocated system resource, the first application program.

12. The apparatus according to claim 7, wherein the processor is further configured to:
- when it is detected that an exit command of the first application program is triggered, obtain, by using the operating system, running information of the first application program, and store, by using the operating system, the running information of the first application program; and
- make the first application program and the operating system dormant by using the process group management interface.

13. The apparatus according to claim 7, wherein the sensing apparatus comprises a touch-sensitive apparatus, a voice sensing apparatus, and/or a motion sensing apparatus.

* * * * *